UNITED STATES PATENT OFFICE.

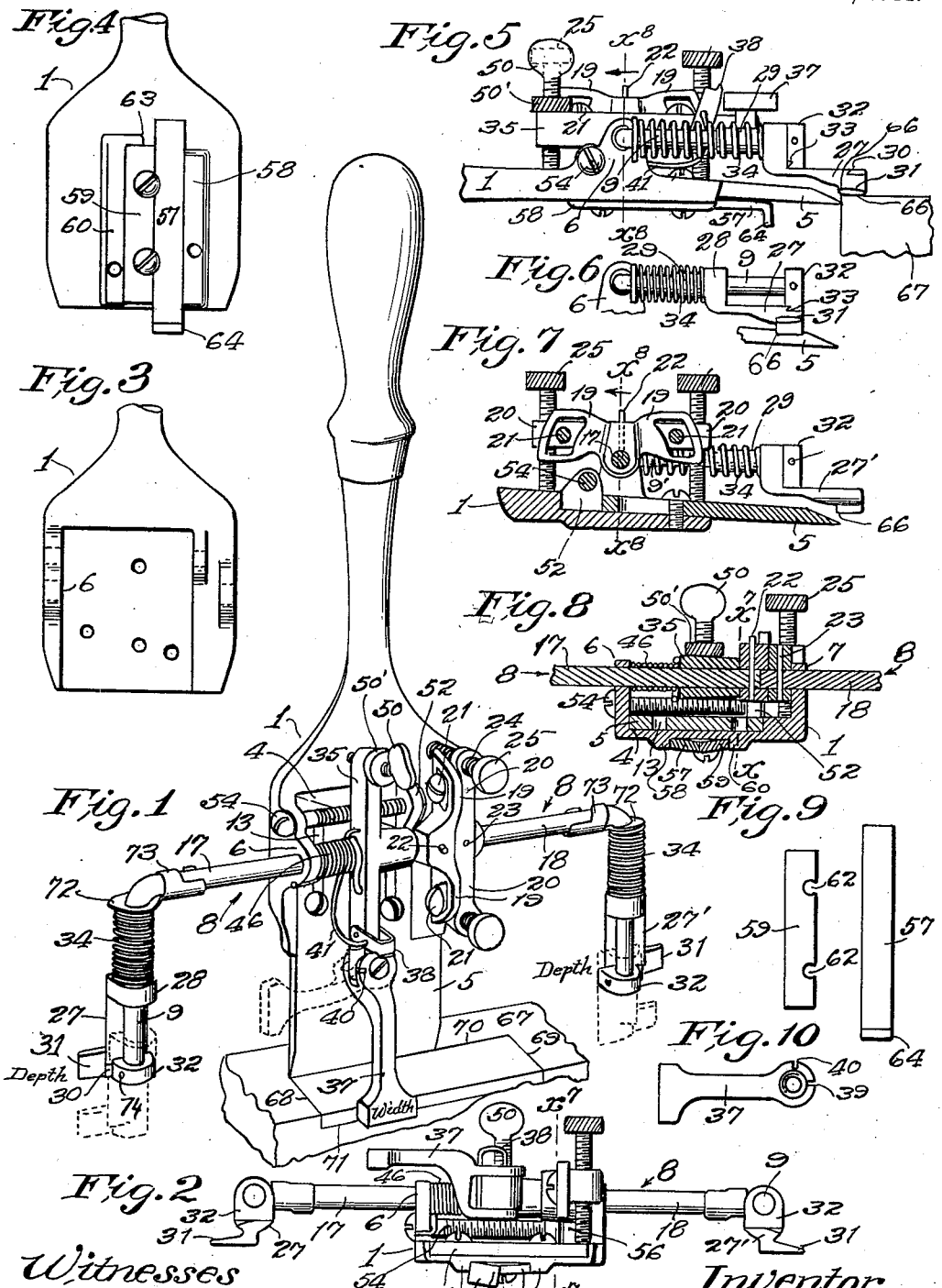

DAVID B. ROUNDS, OF LOS ANGELES, CALIFORNIA.

BUTT-CHISEL AND GAGE.

1,007,607. Specification of Letters Patent. Patented Oct. 31, 1911.

Application filed May 9, 1910. Serial No. 560,345.

*To all whom it may concern:*

Be it known that I, DAVID B. ROUNDS, a citizen of the United States, residing at Los Angeles, in the county of Los Angeles and State of California, have invented a new and useful Butt-Chisel and Gage, of which the following is a specification.

This invention relates to means for cutting the hinge gains in casings and in doors, windows and shutters that are to be hinged to such casings.

The object of this invention is to provide a light, strong, simple, convenient, adjustable and easily operated tool comprising a chisel that can be removed to be sharpened and by means of which said gains may be cut where required in both rabbeted and unrabbeted casings, the gage being readily adjustable to suit all requirements.

The accompanying drawings illustrate the invention.

Figure 1 is a top perspective view of a combined chisel and gage constructed in accordance with this invention and applied to cut the width of gain. The depth gage members are shown out of commission and the width gage member in commission in solid lines and vice versa in dotted lines. Fig. 2 is a front end elevation of the tool. Fig. 3 is a detached detail plan of the head. Fig. 4 is a bottom view of the head. Fig. 5 is a side elevation showing the depth gage members in commission and the width gage member out of commission, and the tool applied to cut the depth of gain. Fig. 6 shows the depth gage tip latched out of commission. Fig. 7 is a sectional elevation on line $x^7$—$x^7$, Figs. 2 and 8. Fig. 8 is a fragmental section on line $x^8$—$x^8$, Figs. 5 and 7, looking toward the left. Fig. 9 is a view of the clamp bar and gage bar detached and spread apart. Fig. 10 is a detached view of the finger forming the width gage. Figs. 3, 4, 5, 6 and 8 are fragmentary.

The head 1 is of metal and is provided at one end with a shank and handle and at the other end with a groove forming a seat for a chisel blade 5. Said head is also provided with journal bearings formed by ears 6, for a rock shaft 8 which extends transversely of the blade seat and is provided with two arms 9 to project away from the handle shank toward the line of the cutting edge of the chisel and which terminate short of such line. The chisel blade 5 is slidably mounted in its seat and is adapted to be shifted to move the cutting edge away from and toward the head. The blade is fastened to the head by means of screws passing through slots 13 in the blade. The rock shaft 8 is constructed of two sections 17 and 18 which are rotatively adjustable with relation to each other, being adjustably clamped together by means of the lugs 19, 20, and the screws 21, the lugs 19 being slotted and the screws extending therethrough and screwed into the lugs 20 to clamp the lugs 19 and 20 in adjustable relation to each other. The lugs 19 are fixed to the rock shaft section 17 by a pin 22 and the lugs 20 are fixed to the rock shaft section 18 by a pin 23. The lugs 20 are provided with adjusting screws 25 engaging the head 1 to tilt the lugs 20. By turning the adjusting screws 25 the arm 9 may be adjusted to extend forwardly in a common plane that is either parallel with or oblique to the plane of the chisel, and when the sections are clamped together by tightening the screws 21 the entire rock shaft may be turned by turning the adjusting screws so as to bring the tips of the arms to any desired position relative to the plane of the chisel blade. The gage tips 27 and 27' of the rock shaft arms are adjustable and each comprises a bearing sleeve 29, a catch 30 and a foot 31. The ends of the arms 9 are provided with heads 32 each having a beveled shoulder 33 into which the catches 30, which are likewise beveled, will engage when the tip is retracted, there being springs 34 on the sleeves 29 and arms 9 to normally hold the tips forward for engagement of the catches in the retracted position and for engagement with the work when the tips are extended. The tips 27 and 27' thus form yielding adjustable gage members normally bearing definite relation to the edge of the chisel and can be adjusted toward and from the plane of the chisel and may be made to project beyond the edge of the chisel to rest upon the edge of the part into which the butt gain is to be cut, and said tips when retracted are entirely rearward from the line of the cutting edge of the chisel, so that said chisel may be used without interference of the tips with the material into which the gain is to be cut; and when it is desired to cut into a surface, such as a rabbeted jamb, against which the tips may engage, said tips will yield to allow the cutting to occur to the width of the hinge. There is also mounted on the rockshaft a cross head 35 to one end of which is pivoted a central width gage member in the form of a finger 37 to project forwardly beyond the chisel and over the same.

A latch 38 is pivoted to the cross head and adapted to enter notches 39 and 40 to hold the gage finger in extended and retracted positions. Said latch is normally held in engaging position by a spring 41 fixed to the cross-head by having its end bent and inserted into a hole therein, the other end of the spring being inserted into a hole in the latch. The spring 46 coiled around the rock shaft and having one end caught on the tool head 1 and the other end inserted into a hole in the cross head tends to resiliently hold the width gage member away from the chisel blade and an adjusting screw 50 provided with a lock-nut 50′ is arranged at the rear end of the cross head to overcome the tendency of the spring and to limit the movement of the central width gage finger away from the chisel blade. The rear end of the chisel blade is transversely oblique and an adjusting block 52 is arranged to slide between said rear end and the rear end wall of the chisel seat to force the chisel blade forward when the chisel blade clamp screws are loosened. Said block is adjustable by means of a screw 54 mounted in bearings formed by ears that project from the face of the tool head. By turning the screw 54 when the chisel blade is free, the block may be brought to any desired position transversely of the chisel seat, thus advancing the chisel edge within the desired limits and supporting said edge against rearward movement relative to the head. When the chisel blade is properly adjusted the clamp screws will be tightened to hold it in place.

On the under side of the head there is provided a gage bar 57 which is slidably mounted in a dovetail way formed by an undercut rib 58 on the one side and an undercut clamp bar 59 on the other side, said clamp bar being held by a rib 60 and by set screws as shown, and being undercut on that edge which engages the gage bar as shown in Fig. 2. Said gage bar and clamp bar are of a combined width slightly greater than the width of the groove 62 between the ribs 58 and 60 so that when the two bars are in the groove and their outer edges are seated in the groove the bars must be canted in order to bring their inner edges against each other and when the set screws 61 are tightened a toggle joint effect is produced to cause great frictional engagement to prevent slippage of the gage bar 57, which is made smooth so as to readily slide forward and back when the set screws are loosened. The clamp bar 59 is provided with notches 62 in its inner edge to accommodate the set screws, which serve to prevent slippage of the clamp bar. A shoulder 63 is also provided at the rear of the rib 60 to support the clamp bar against rearward thrust.

By loosening the set screws the gage bar may be shifted endwise toward and from the edge of the chisel. Said gage bar is provided with a tongue 64 which may serve as a thumb piece and may also serve to engage the work to limit the depth to which the chisel may cut. Said bar and tongue are at the back under side of the chisel, being adjacent the flat side of the chisel.

The feet 31 of the gage tips have heels 66 that terminate rearwardly approximately in the vertical plane in which the cutting edge of the chisel lies when the tool is set for use and the gage tips are released as shown in dotted lines in Fig. 1 and in solid lines in Figs. 5 and 7. The purpose of this is to allow the gage tips to rest on the work 67 when the depth of gain is being cut as in Fig. 5. The rear edge of the heels 66 form pivotal rests in the same vertical plane with the cutting edge so that the handle of the tool may vary from the horizontal position without changing the depth cut by the edge 10 as the chisel is driven to the right in Fig. 5. In Fig. 1 the outline of the gain to be cut is indicated by the end lines 68, 69, the width line 70 and the depth line 71.

In the form shown, the arms 9 are provided with annular shoulders 72 to support the rear ends of the springs 34. Said shoulders are formed on open sheet metal sleeves 73 that are bent to encircle the rock shaft to hold the shoulders from slipping. The heads 32 are fastened on the ends of the arms 9 by pins as shown.

In practice the tool is used for cutting in door jambs and in doors, gains that are to be occupied and tightly fitted by the hinges or butts which are to hold the doors in place.

By referring to Figs. 1 and 5 the method of using the tool may be understood. The operator will first mark upon the doors and jambs at the required places the width of the gains or scarfs which are to be cut. This he will do by taking a half hinge and applying it to the jambs and doors at the appropriate places and marking at the ends of the half hinge, lines corresponding to lines 68 and 69 on the door 67 in Fig. 1. The operator will then adjust the tool to conform to the adjustment shown in Fig. 1 turning the thumb-screw 50 until he adjusts the end of the width gage 37, so that the space between the inner face of said gage and the cutting edge 10 will be equal to the width desired for the gain. He will then apply the tool to cut the width of gain as shown in Fig. 1, the gage 37 engaging the edge of the work (as the door 67) and thereby directing the cutting edge 10 along the line indicated at 70 between the lines 68 and 69 which he has marked. After the line 70 has been cut to approximately the depth required the operator will turn the width gage 37 out of commission as indicated by the dotted position in Fig. 1; and allowing the depth gages 27 and 27' to still remain out of commission he is enabled to turn the tool into transverse position so as to cut into the work along the lines 68 and 69 approximately to the depth required. Then he may score the surface included within the lines 68, 69 and 70, thus cut, after which he will turn the depth gages 27 and 27' into commission as indicated in dotted lines in Fig. 1, and shown in solid lines in Figs. 5 and 7; and will then apply the tool to trim the gain to the depth required and which depth will be determined by the adjustment which has been given to the depth gages. The width gage bar 57 is so set that it will contact with the work when the chisel edge 10 has been driven home to the line 70 so that the width of gain will be uniformly cut.

The depth gages are easily adjusted at any time to gage the appropriate depth by loosening the screws 25, and placing the tool in the position on the work shown in Fig. 5 and bringing the parts into position as shown in that figure where the edge of the tool comes against the work at the appropriate depth when the heels of the depth gages are resting on the work. Then the screws 25 will be tightened, thus holding the depth gages in place. In case the arms of the depth gages get bent or are otherwise put out of alinement the alinement can be restored by loosening the screws 21 and restoring the adjustment as before by placing the tool and its parts into the position shown in Fig. 5 and previously described, after which the screws may again be tightened.

When it is desired to cut a gain of determined depth for a considerable distance, as for instance, when the length of the gain is wider than can be accommodated between the depth gages, one of the depth gages may be lowered to rest on the floor of the portion of the gain which has been cut; this being readily done by simply loosening the screws 21 as before stated and applying the tool with one of the heels on the face of the work and the other heel on the floor of the gain while the chisel is in the same position shown in Fig. 5 at the level of the floor of the gain. Then the screws 21 may again be tightened; whereupon the work may be continued indefinitely; the lower heel running along the floor of the cut portion of the gain while the other heel runs along the surface of the work. In cases of this kind when the chisel is driven home to trim the full width of the gain, the gage spring 34 of the lowered gage yields when it comes against the wall of the gain, thus allowing the chisel to cut the full width of gain.

I claim:—

1. The combination with a tool head, of a chisel blade carried by the tool head, a rock shaft journaled on the head and provided with forwardly projecting arms, and gage tips on said arms.

2. The combination with a tool head, of a chisel blade carried by the tool head, a rock shaft journaled on the head and provided with forwardly projceting arms, and adjustable gage tips on said arms.

3. The combination with a tool head, of a chisel blade carried by the tool head, a rock shaft journaled on the head and provided with forwardly projecting arms, and gage tips slidably mounted on said arms and springs to hold said gage tips forward.

4. The combination with a tool head, of a chisel blade carried by the tool head, a rock shaft journaled on the head and provided with forwardly projecting arms, gage tips slidably mounted on said arms and springs to hold said gage tips forward, and means to hold the gage tips retracted.

5. The combination with a tool head, of a chisel blade mounted on said head, a rock shaft mounted on said head and provided with gage arms, and means for adjusting said rock shaft on the head.

6. The combination with a tool head, of a chisel blade mounted on said head, a rock shaft mounted on said head and provided with gage arms, and set screws for adjusting the rock shaft on the head.

7. The combination with a tool head, of a chisel blade carried by said head, a sectional rock shaft, said rock shaft being provided with gage arms, means for adjustably connecting the sections of the rock shaft together, and means for adjusting the rock shaft on the head.

8. The combination with a head provided with a chisel seat, a chisel blade seated in the seat and having an oblique rear end, a block between the end of the chisel blade and the end of the seat, means to adjust the block across the seat, and means to hold the chisel blade in the seat.

9. The combination with a head provided with ears and a seat for a chisel blade, of a chisel blade in said seat, said blade having an oblique end, a block in the seat between the end of the chisel blade and the end of the seat and a screw mounted in said ears and screwed through said block to adjust the block and the chisel blade.

10. The combination with a head, of a chisel blade carried by the head, a rock shaft mounted on the head and provided with arms projecting toward the plane of the edge of the blade, gage tips slidably mounted on the arms, springs to hold the gage tips forward and catches between the arms and tips to hold the tips retracted.

11. The combination with a head, of a chisel blade fastened to the head, a rock-shaft mounted on the head and provided with forwardly projecting arms, gage tips slidingly mounted on the arms and provided with heels, springs to normally hold the gage tips forward, and catches to hold the gage tips retracted.

12. In a butt chisel and gage, the combination with a chisel carrying head, of a rock-shaft formed of two sections, each section provided with a forwardly projecting arm, lugs on said sections respectively, means to adjustably connect the lugs to allow the arms to be relatively rotated and to fasten said sections to prevent such rotation, and means to adjustably hold the rock-shaft against rotation.

13. In a butt chisel and gage, the combination with a head provided with a chisel blade, of a shaft, a cross-head on the shaft, a gage finger on the cross-head, a spring to normally hold the free end of the gage finger from the chisel edge, and means to adjust the cross-head to force said end of the gage finger toward the chisel head.

14. In a butt chisel and gage, the combination with a head provided with a chisel blade, of a shaft, a cross-head on the shaft, a gage finger pivoted on the cross-head, a spring to normally hold the gage finger from the chisel edge; means to adjust the cross-head to force the gage finger toward the chisel edge, and a latch to hold the pivoted finger in different positions.

15. In a butt chisel and gage, the combination with a head provided with a chisel blade, of a shaft, a cross-head on the shaft, a gage finger pivoted on the cross-head and provided with notches, a spring to normally hold the gage finger from the chisel edge, means to adjust the cross-head to force the gage finger toward the chisel edge, and a latch to engage the notches.

16. In a butt chisel and gage, the combination with a head provided with a chisel blade, of a shaft, a cross-head on the shaft, a gage finger pivoted on the cross-head and provided with notches, a spring to normally hold the gage finger from the chisel edge, means to adjust the cross-head to force the gage finger toward the chisel edge, a latch to engage the notches, and a spring carried by the shaft to hold the latch in latching position.

17. A butt chisel and gage comprising a head, a chisel blade carried by the head, adjustable depth gages carried by the head at the sides thereof, a pivoted width gage finger carried by the head in front of the chisel blade, and a width gage bar at the back of the blade.

18. A butt chisel and gage comprising a head, a chisel blade carried by the head, adjustable depth gages carried by the head at the sides thereof, an adjustable pivoted width gage finger carried by the head in front of the chisel blade, and a width gage bar at the back of the blade.

19. A butt chisel and gage comprising a head, a chisel blade carried by the head, adjustable depth gages carried by the head at the sides thereof, a pivoted width gage finger carried by the head in front of the chisel blade, a width gage bar at the back of the blade, and means for adjustably clamping the bar to the head.

In testimony whereof, I have hereunto set my hand at Los Angeles, California, this 3rd day of May, 1910.

DAVID B. ROUNDS.

In presence of—
JAMES R. TOWNSEND,
L. BELLE RICE.

---

Copies of this patent may be obtained for five cents each, by addressing the " Commissioner of Patents, Washington, D. C."